July 25, 1933.  J. L. KELLY  1,919,224
ANTIGLARE SHIELD FOR HEADLIGHTS
Filed Nov. 27, 1931
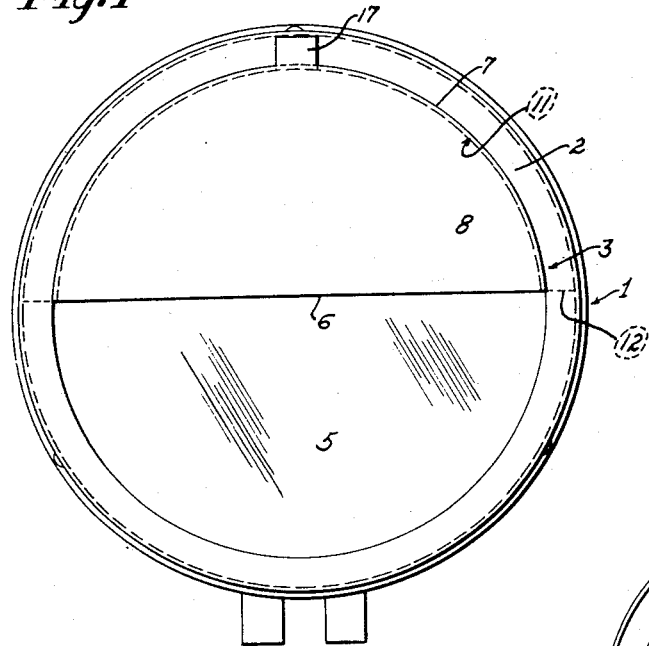
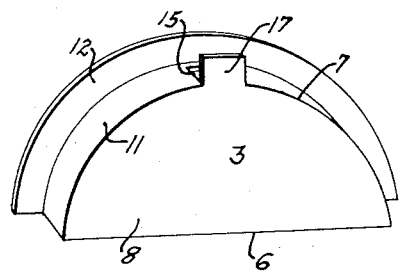
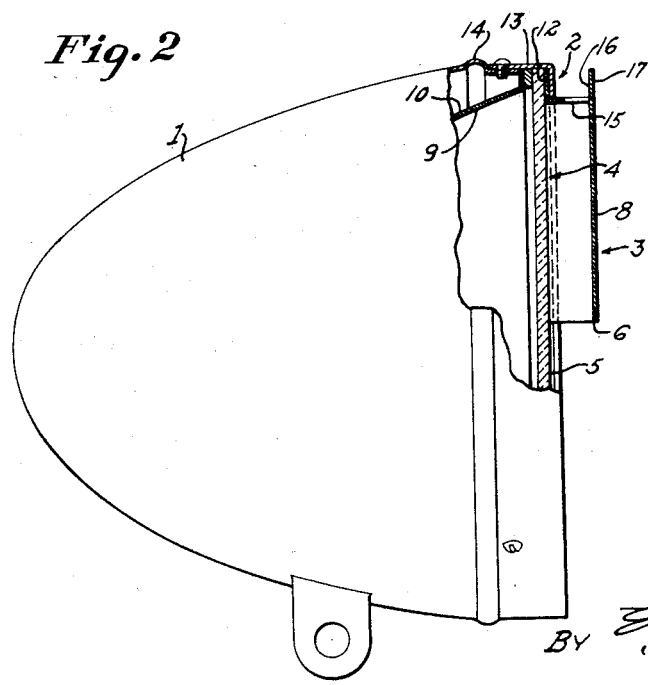
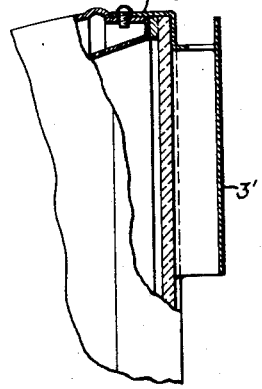
INVENTOR
J. L. KELLY
BY E. M. Harrington
ATTORNEY Patented July 25, 1933

1,919,224

UNITED STATES PATENT OFFICE

JOHN L. KELLY, OF ST. LOUIS, MISSOURI

ANTIGLARE SHIELD FOR HEADLIGHTS

Application filed November 27, 1931. Serial No. 577,505.

This invention relates to improvements in anti-glare shields for headlights, and has for its object to provide means whereby the glare of a headlight may be shielded from on-coming traffic. Another object of the invention is to provide means whereby the driver of a motor vehicle may know whether or not his headlights are operating.

Another object of the invention is to provide a glare shield so placed in front of a headlight lens as to protect on-comers from the direct rays of the light and at the same time permit access to the lens for cleansing purposes.

With the above and such other objects in view as may hereinafter more fully appear, I have devised the improved arrangement shown in the accompanying drawing in which Figure 1 is a front elevational view of a headlight having my invention associated therewith.

Figure 2 is a view partially in vertical section and partially in side elevation showing a headlight having my device associated therewith.

Figure 3 is an enlarged perspective view of the invention, removed from the lamp box.

Figure 4 is a modified form of the invention.

Like reference characters indicate like parts throughout the following specification, and in the several views of the drawing in which 1 indicates an automobile headlight to the upper part 2 of which is attached a combined glare shield and light reflector 3. The member 3 is so shaped as to cover the upper portion 4 of the lens 5, and has a substantially straight lower edge 6 and an upper peripheral portion 7, conforming to the arc of the edge of the lens 5, whereby its shield plate 8 will effectively cut off any light rays from the upper part 9 of the reflector 10. The plate 8 is provided with an arcuate flange 11, extending from its arcuate portion 7, which flange terminates in a rectangular out-turned flange 12, adapted to be seated between the lens 5 and the retainer ring 13, whereby the device is held in place on the headlight. The depth of the flange 11 is such as to hold the plate 8 far enough from the lens 5 to permit cleansing of the lens without removing the device from the lamp box 14. The flange 11 is provided with a cut-out portion providing an aperture 15 through which rays of light may project up and against the rear wall 16 of the light reflector member 17. The light reflector 17 preferably is an integral upwardly extending portion of the flange 11 and projects from the upper portion of the shield 3 at the approximate center thereof, said light reflector being an upset portion of the flange 11 and the aperture 15 being the space from which said light reflector is displaced.

In the use of the improved device disclosed herein rays of light from the associated headlight are prevented, by the presence of the shield from being cast forwardly of said headlight at such elevations as to interfere with the vision of operators of approaching vehicles. In other words, all of the light rays cast by the headlight emanate from the lower portion of said headlight and, therefore, said light rays are maintained below a predetermined horizontal plane above which light rays might trouble operators of approaching vehicles.

An important feature of the invention is that light from within the housings of the headlights may pass through the apertures 15 and shine on the reflector members 17 so as to indicate to the operators of vehicles equipped with my improved devices whether or not the headlights are operating.

If desired, the plate shield may be formed as a part of the retainer ring of the headlight as shown in Figure 4, in which view 3' designates the shield and 13' indicates the retainer ring.

I claim:

1. In combination with a motor vehicle headlight having a lens and a retaining ring for holding said lens in place, an anti-glare device comprising a shield of semicircular shape adapted for arrangement adjacent to the outer face of the upper portion of the lens of said head light, said shield comprising a front wall arranged substantially parallel with respect to said lens and in spaced relation therewith, a continuous arcuate wall extended between said lens and said front wall of the shield, and an outwardly extended arcuate flange disposed between said lens and the retaining ring therefor so as to secure the shield in place, said front wall, arcuate wall, and flange being in the form of a one-piece integral structure.

2. In combination with a motor vehicle headlight having a lens and a retaining ring for holding said lens in place, an anti-glare device comprising a shield of semicircular shape adapted for arrangement adjacent to the outer face of the upper portion of the lens of said headlight, said shield comprising a front wall arranged substantially parallel with respect to said lens and in spaced relation therewith, a continuous arcuate wall extended between said lens and said front wall of the shield, and an outwardly extended arcuate flange disposed between said lens and the retaining ring therefor so as to secure the shield in place, said front wall, arcuate wall, and flange being in the form of a one-piece integral structure, and a light reflector extended upwardly from the upper portion of said arcuate wall, said arcuate wall being provided with an opening formed therethrough to permit passage of light rays from within the shield to said reflector.

3. In combination with a motor vehicle headlight having a lens and a retaining ring for holding said lens in place, an anti-glare device comprising a shield of semicircular shape adapted for arrangement adjacent to the outer face of the upper portion of the lens of said headlight, said shield comprising a front wall arranged substantially parallel with respect to said lens and in spaced relation therewith, a continuous arcuate wall extended between said lens and said front wall of the shield, and an outwardly extended arcuate flange disposed between said lens and the retaining ring therefor so as to secure the shield in place, said front wall, arcuate wall, and flange being in the form of a one-piece integral structure, and a light reflector extended upwardly from the upper portion of said arcuate wall, said arcuate wall being provided with an opening formed therethrough to permit passage of light rays from within the shield to said reflector and said reflector being an integral part of said arcuate wall which is displaced from said opening.

JOHN L. KELLY.